United States Patent [19]
DiToro

[11] 3,955,050
[45] May 4, 1976

[54] SYSTEM FOR AUDIBLY RECOGNIZING AN AURALLY UNCLASSIFIABLE SIGNAL

[75] Inventor: Michael J. DiToro, Massapequa, N.Y.

[73] Assignee: General Signal Corporation, New York, N.Y.

[22] Filed: Apr. 30, 1975

[21] Appl. No.: 573,267

[52] U.S. Cl. ............................... 179/1 SA; 325/60; 343/8; 340/384 E; 340/258 A
[51] Int. Cl.² ..................... G10L 1/00; G01D 21/04
[58] Field of Search ............. 179/1 SA; 325/60, 61; 340/1 R, 3 R, 3 D, 293, 258 A, 258 R, 258 B, 384 R, 384 E; 343/8, 5 PD

[56] References Cited
UNITED STATES PATENTS

| | | | |
|---|---|---|---|
| 3,021,479 | 2/1962 | DiToro | 360/8 |
| 3,369,228 | 2/1968 | Foster | 340/258 R |
| 3,388,398 | 6/1968 | Kratzer | 343/8 |
| 3,798,644 | 3/1975 | Constant | 343/8 |
| 3,882,495 | 5/1975 | Bolger | 343/5 PD |
| 3,887,896 | 6/1975 | Ramstedt | 340/3 R |

Primary Examiner—Kathleen H. Claffy
Assistant Examiner—E. S. Kemeny
Attorney, Agent, or Firm—Laurence B. Dodds

[57] ABSTRACT

This invention relates to a system for audibly recognizing a received signal aurally unclassifiable because of its improper (not clearly bearable) time duration and/or the frequency band occupied thereby. The received signal may be a carrier wave, modulated in amplitude and phase in accordance with the amplitude and phase of a signal to be recognized. In such case, the system includes modulator means for deriving quadrature base-band signal components. The system also includes a signal-storage device, such as a signal recorder movable at one speed during storage of a received signal thereon and at a different speed during retrieval of the signal therefrom, and means for storing the quadrature signal components in the storage device as received. The detected signal is thus translated in frequency on readout, then further processed to derive two control signals: one to vary a VCO whose audible output is representative of the original signal; the other control signal to amplitude-modulate the output of the Voltage-Controlled Oscillator.

6 Claims, 4 Drawing Figures

SYSTEM FOR AUDIBLY RECOGNIZING AN AURALLY UNCLASSIFIABLE SIGNAL

BACKGROUND OF THE INVENTION

1. Field of the Invention

This invention relates to a system for audibly recognizing a received signal aurally unclassifiable because it is too short or too long in its time duration and/or its frequency band is too narrow or too wide. Signals of such types are conventionally received from various sensors such as infiltration radars, seismic exploration sensors, medical diagnostic apparatus, etc.. The present invention is a simplification of that described and claimed in applicant's copending application Ser. No. 505,556, filed Sept. 13, 1974, entitled "System for Audibly Recognizing an Aurally Unclassifiable Signal," and assigned to the same assignee as the present application. The present invention is suitable for use particularly when it is desired to recognize a single signal, the waveform of which occupies a relatively narrow frequency band and whose frequency location is time-variable. The present invention permits the use of relatively simple and low-cost apparatus.

2. Description of the Prior Art

No prior art apparatus similar or equivalent to that of the present invention is known although there have been proposed certain computer-oriented algorithms which can be used to perform the detection and classification of received signals. However, such methods require lengthy computer statistical learning and classification processing. As a result, real-time signal processing is neither possible with a single computer nor economical with multiple paralleled computers.

The system of the present invention may be used to invoke the ear-brain for performing the functions of learning, detection, and subsequent classification of aurally unclassifiable signals, both economically and in real-time.

SUMMARY OF THE INVENTION

In accordance with the invention, a system for audibly recognizing a received signal aurally unclassifiable because of its improper time duration and/or the frequency band occupied thereby comprises a signal-storage device, means for storing the signal in the signal-storage device as received, means for retrieving the signal from such device at a time-rate differing from the storing rate, means for developing a control signal varying in magnitude with the instantaneous frequency of the retrieved signal, and an adjustable-frequency audible-tone generator responsive to the control signal, such generator having an output circuit effective to supply an audible signal representative of the received signal.

DESCRIPTION OF THE DRAWINGS

FIG. 2 is a vector diagram showing the $x$ and $y$ components of the received signal;

FIG. 3 is a circuit diagram of a transconductance signal multiplier suitable for use in the system of FIG. 1; while FIG. 4 is a circuit diagram of a signal-divider circuit suitable for use in the system of FIG. 1.

DESCRIPTION OF THE PREFERRED EMBODIMENT

The characteristics of typical signals generated by various sensors and the reasons why they may be aurally unclassifiable, together with certain response characteristics of the human ear-brain combination, are set forth in detail in aforesaid copending application Ser. No. 505,556 and need not be repeated here.

The generic problem is to provide a time, frequency, or combined time-frequency signal transformation which results in a signal simultaneously having a sufficient time duration to allow aural spectral resolution and also having a frequency-resolution span falling within the aural frequency span roughly extending from 200 to 4,000 Hz.

Figure 1:
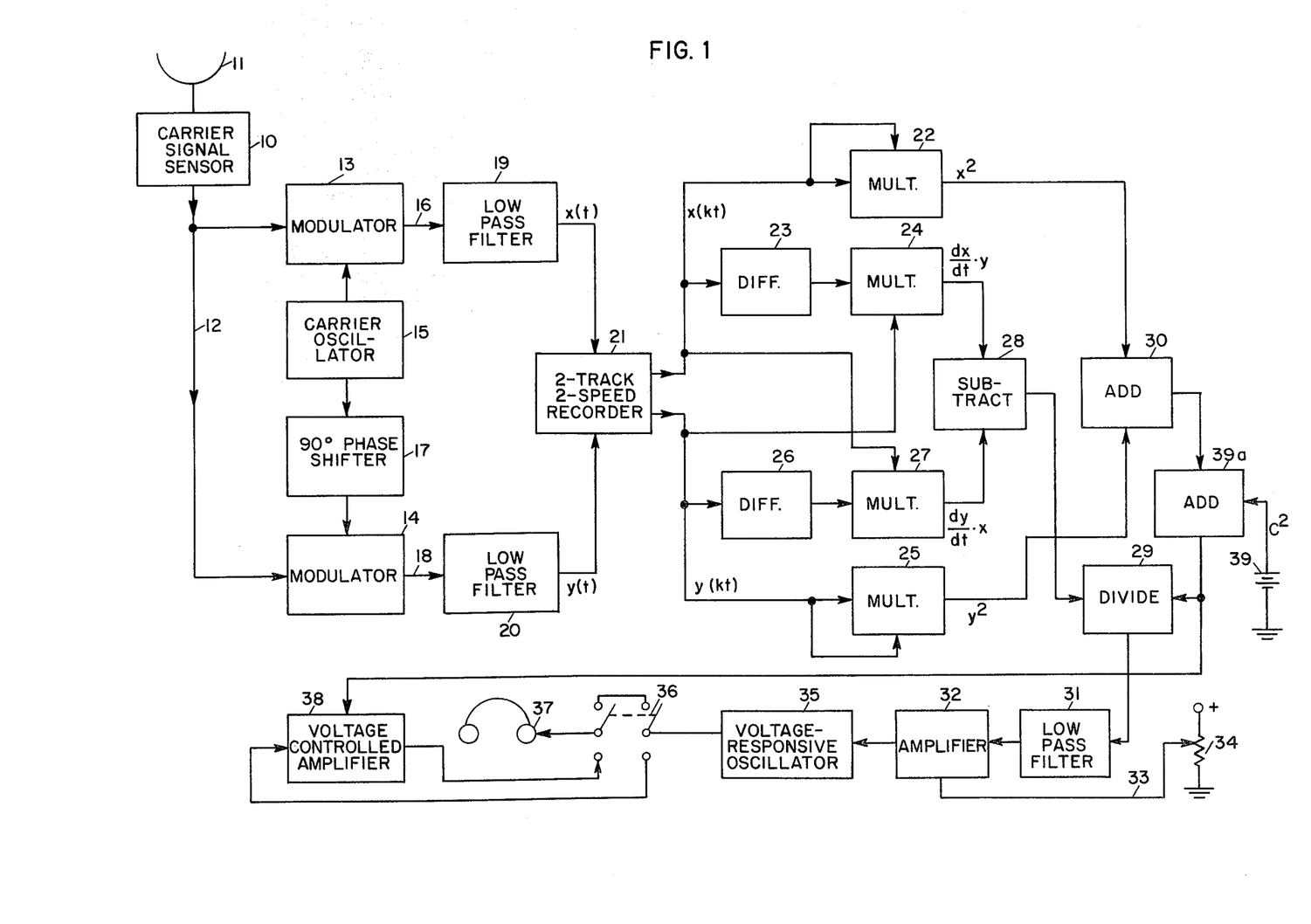
FIG. 1 is a schematic single-line, signal-flow diagram of a complete signal recognition system embodying the invention.
Figures 2, 3, 4:
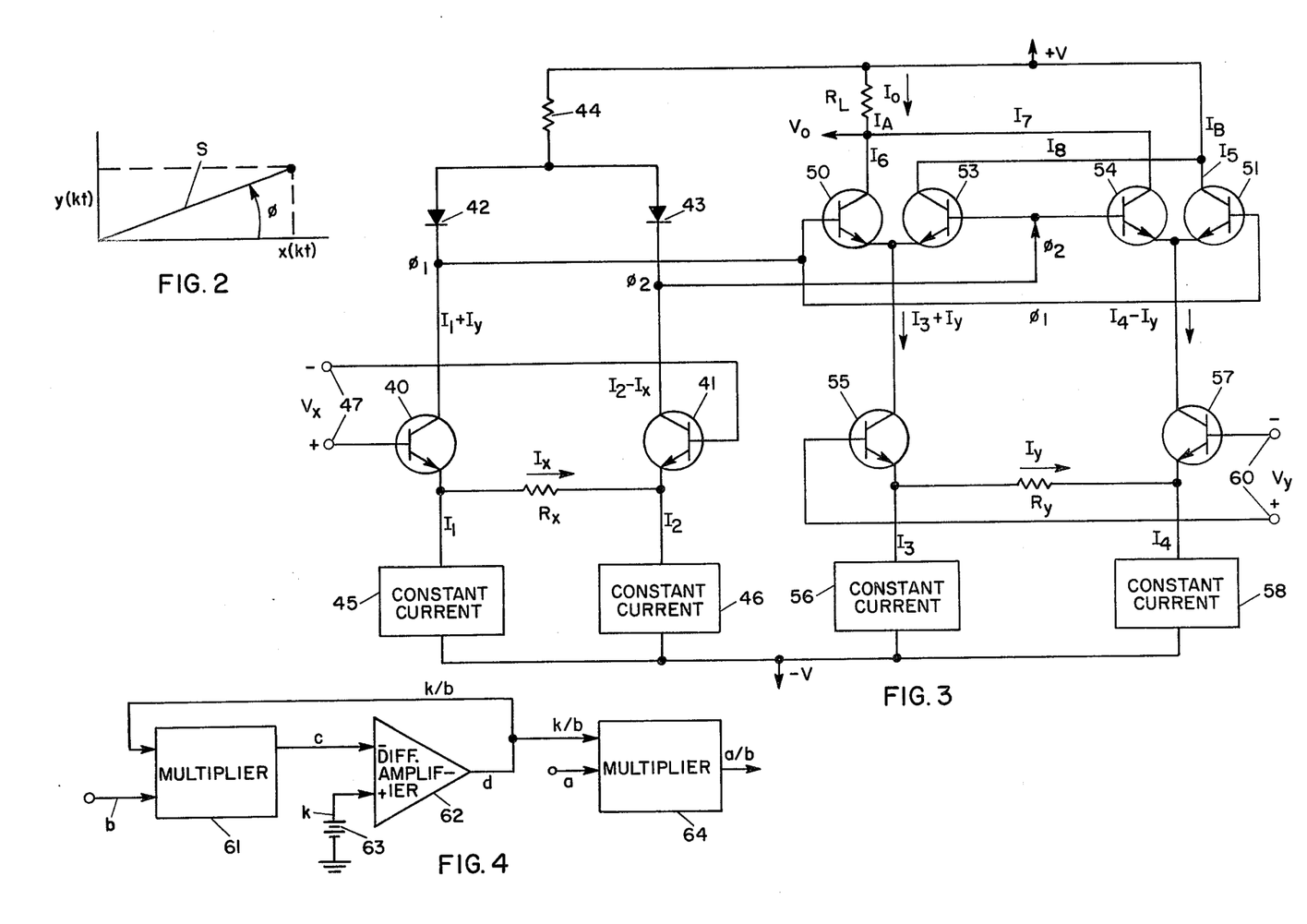

A simplified system for audibly recognizing a received signal aurally unclassifiable because of its short or long time duration and/or the frequency band occupied thereby is represented by FIG. 1 which is a schematic diagram of a system for audibly recognizing an aurally unclassifiable signal. The system includes a carrier-signal sensor 10 connected to a receiving antenna or equivalent 11 for receiving a carrier-wave signal modulated in amplitude and phase in accordance with the amplitude and phase of the signal to be recognized. The sensor 10 has an output circuit 12 connected to modulators 13 and 14. A carrier oscillator 15 supplies a carrier-frequency signal directly to the modulator 13 to develop in its output circuit 16 the received information-bearing signals at base-band frequency. The oscillator 15 also supplies a similar carrier-frequency signal to the modulator 14 via the 90° phase-shifter 17. The modulators 13 and 14 thus supply in their output circuits 16,18 quadrature base-band signal components of the received signal. The outputs of modulators 13 and 14 are passed through low-pass filters 19,20 respectively, in the outputs of which appear the filtered signal components $x(t)$ and $y(t)$, as shown in FIG. 2. These two signal components are stored upon a 2-track multi-speed signal recorder 21. By operating the recorder 21 at different speeds during recording and signal retrieval, the frequency spectrum of the information-bearing signal components may be stepped up or stepped down in accordance with the relationship of their frequency to the best aural reception frequency, becoming $x(kt)$ and $y(kt)$.

The two signal components $x(kt)$ and $y(kt)$ are impressed upon means for deriving from the signal components a signal representative of the instantaneous frequency of the retrieved signal. Specifically, the signal $x(kt)$ is applied to a multiplier 22 in which the signal is multiplied by itself or squared. It is also applied to a differentiating circuit 23, the output of which is applied to a multiplier 24, to which is also applied the signal component $y(kt)$, thus producing an output signal $$\frac{dx}{dt} \cdot y.$$

Similarly, the quadrature-signal component $y(kt)$ is applied to multiplier 25 in which the signal is multiplied by itself or squared. Also, the quadrature-signal component $y(kt)$ is applied to a differentiating circuit 26, the output of which is applied to a multiplier 27, to which is also applied the signal $x(kt)$, thus producing an output signal $$\frac{dy}{dt} \cdot x.$$

The outputs of the multipliers 24 and 27, $$\frac{dx}{dt} \cdot y \quad \text{and} \quad \frac{dy}{dt} \cdot x,$$

are applied to a subtraction circuit 28 and their resultant difference signal is applied to a divider unit 29. At the same time, the $x$ and $y$ signal components, after squaring, are applied to an adding circuit 30, to the output of which is added a constant positive signal $c^2$ from battery 39 via the add unit 40. The resultant summation signal is then applied to another input circuit of the divider unit 29.

The $x(kt)$ and $y(kt)$ signal components are represented in FIG. 2 in which the resultant signal S is shown to have a phase angle:

$$\phi = \tan^{-1} \frac{y(kt)}{x(kt)} \qquad (1)$$

The instantaneous frequency of the received signal which it is desired to sense is represented by the relationship:

$$f_i = \frac{d\phi}{dt} = \frac{x \frac{(dy)}{(dt)} - y \frac{(dx)}{(dt)}}{x^2 + y^2 + c^2} \qquad (2)$$

It is seen that Equation (2) represents the output of the divider unit 29 and is thus representative of the instantaneous frequency of the received signal when $c_2$ is made small compared with $x^2 + y^2$. The output of the divider unit 29 is passed through a low-pass filter 31 to an amplifier 32, the gain of which is adjustable by a slider 33 of a voltage-divider 34. Thus the divider unit 29 and amplifier 32 constitute means for deriving from the retrieved signal components a control signal varying with and representative of the magnitude of the instantaneous frequency of the received signal. The control signal output of amplifier 32 is applied to a voltage-responsive, adjustable-frequency, audible-tone oscillator or generator 35 having an output circuit effective to supply an audible signal representative of the received signal. This output circuit is connected via a two-pole switch 36, thrown in its upper position, to an audio-signal sensor schematically represented as a pair of earphones 37.

The constant and positive signal $c^2$ is used to avoid division by zero in the event that $x^2 + y^2$ is zero. Also, when $c^2$ is made much larger than $x^2 + y^2$, the output of divider 29 is representative of a signal varying according to the actual instantaneous frequency, weighted by the magnitude-squared signal $x^2 + y^2$. This gives more predominance to higher-energy signals.

In the event that it is desired aurally to sense both the amplitude and the instantaneous frequency of the received signal, there may be included means for deriving from the retrieved signal components a second control signal representative of the amplitude of the retrieved signal. Thus the signal output of adder 39a, which represents $x^2 + y^2 + c^2$, may be used as a second control signal applied to a voltage-controlled amplifier 38 connected in series with the earphones 37 with the switch 36 in its lower position, thus to vary the amplitude of the audible-tone signal output of the oscillator 35 in response to the control signal.

Referring now to FIG. 3 of the drawings, there is represented the circuit diagram of a transconductance signal multiplier suitable for use as each of the units 22, 24, 25, and 27 of FIG. 1. Such a unit develops an output voltage which is representative of the product of two input voltages $V_x$ and $V_y$. At the left of FIG. 3 is a differential-signal amplifier comprising a pair of transistors 40,41 connected in parallel across a supply circuit +V,–V through diodes 42,43 respectively, and a common load resistor 44. Individually connected in series with the transistors 40,41 are constant-current devices 45,46 respectively, which act to maintain the total collector currents of the transistors constant.

The input voltage $V_x$ to be multiplied is supplied by terminals 47 and is applied between the base electrodes of transistors 40,41 while the emtters of the transistors are interconnected through a resistor $R_x$. If the input voltage $V_x$ is zero, equal collector currents flow through the two transistors and their respective diodes 42,43 while no current flows through resistor $R_x$. However, the application of an input voltage $V_x$ between the bases of the transistors causes substantially linear equal and opposite variations of the collector currents through the transistors and their respective diodes, the difference current flowing through resistor $R_x$. A typical voltage-current relation for the diodes 42,43 is that in which the current I varies exponentially with the applied voltage, that is:

$$I \propto e^V \qquad (3)$$

Conversely, $$V \propto \log_e (I) \qquad (4)$$

That is, the voltage drop across each of the diodes 42,43 is a function of the natural logarithm of the input signal $V_x$.

The voltages $0_1$ and $0_2$ developed at the anodes of diodes 42,43 respectively, are applied to a double set of differential amplifiers. Specifically, the voltage $0_1$ is applied between the base electrodes of transistors 50,51 connected in parallel across the supply circuit +V,–V, the collector circuit of transistor 50 including a load resistor $R_L$, and comprising a first differential amplifier. Similarly, the voltage $0_2$ is applied between the base electrodes of transistors 53,54 which are connected in parallel with transistors 50,51 respectively, and comprise the second differential amplifier.

In series with the transistors 50 and 53 are connected a transistor 55 and a constant-current device 56 while in series with transistors 51 and 54 are connected a transistor 57 and a constant-current device 58. A resistor $R_y$ is connected between the emitters of transistors 55 and 57 to carry the difference current between the two branches of the differential amplifiers. As in the case of the transconductance amplifier comprising transistors 40,41, the constant-current devices 56,58 maintain the total collector currents of the transistors 55,57 constant. The second voltage to be multiplied $V_y$ is applied from terminals 60 between the base electrodes of the transistors 55,57.

In a manner identical to that by which the voltage $V_x$ produces a linear change in the collector currents of the transistors 40,41 to which it is applied, the voltage $V_y$ creates the same linear change in the collector currents of the transistors 55,57 which, in turn, are the collector currents of the differential amplifiers comprising transistors 50,51 and 53,54.

From FIG. 3 it is evident that the following relationships obtain:

$$I_3 + I_y = I_6 + I_8 \tag{5}$$

$$I_4 - I_y = I_5 + I_7 \tag{6}$$

$$I_1 = I_6 + I_7 \tag{7}$$

$$I_8 = I_8 + I_5 \tag{8}$$

$$I_8 = \frac{I_3 + I_y}{1 + e^{\left[\frac{\phi_1 - \phi_2}{V_T}\right]}} \tag{9}$$

$$I_5 = \frac{I_4 - I_y}{1 + e^{\left[\frac{\phi_2 - \phi_1}{V_T}\right]}} \tag{10}$$

$$I_6 = \frac{I_3 + I_y}{1 + e^{\left[\frac{\phi_2 - \phi_1}{V_T}\right]}} \tag{11}$$

$$I_7 = \frac{I_4 - I_y}{1 + e^{\left[\frac{\phi_1 - \phi_2}{V_T}\right]}} \tag{12}$$

where $V_T$ is a constant.

It has been shown mathematically ("Application Note AN-489, ANALYSIS AND BASIC OPERATION OF THE MC1595, MULTIPLIER SERIES - PART 1," Motorola Semiconductor Products Inc.) that, with a few simplifying assumptions, the voltage across the load resistor $R_L$ is expressed as follows:

$$V_o \approx \frac{2R_L V_x V_y}{I_1 R_x R_y} \tag{13}$$

$$V_o \approx k V_x \cdot V_y \tag{14}$$

where $$k = \frac{2R_L}{I_1 R_x R_y} \tag{15}$$

The simplifying assumptions involved in the foregoing mathematical derivation were the following:
1. The transistors are identical and matched where necessary.
2. The transistor base currents are negligible as compared to their collector currents.
3. The resistance values of the transistor bulk emitter resistances are less than 1 percent of the values of $R_x$ and $R_y$.

Thus, each of the multipliers 22, 24, 25, and 27 of FIG. 1, represented in detail in FIG. 3, does effect the multiplications as described above.

A circuit suitable for use as the divider 29 of FIG. 1 is shown in FIG. 4. In this circuit, input signal $b$ is applied to a multiplier unit 61, the output signal $c$ being applied to the negative terminal of a differential amplifier 62, to the positive terminal of which is applied a constant positive potential $k$, for example, from a battery 63. The output signal of differential amplifier 62 is coupled as a negative feed-back to a second input terminal of multiplier 61. The output signal of differential amplifier 62 is also applied to one terminal of a multiplier 64, to the other terminal of which is applied the signal $a$.

The operation of the divider circuit of FIG. 4 may be explained as follows. The gain of the amplifier 62 is assumed to be high, in which case the voltage $k$ applied to the upper or negative terminal will attempt to null the voltage $k$ applied to the lower or positive terminal. For example, if the input signal applied to the negative terminal is less than the input signal applied to the positive terminal, the output signal $d$ of the amplifier 62 will be positive and this positive voltage is fed back to the upper terminal of multiplier 61, which results in forcing the product signal $c$ to approach the value of $k$. Therefore it can be seen that the following approximate relationship obtains:

$$c = k, \text{ a constant} \tag{16}$$

$$d = k/b \tag{17}$$

Hence the output of amplifier 62 varies as the inverse of the $b$ signal, that is, $k/b$. The latter signal is multiplied by the $a$ signal in multiplier 64, producing an output signal of $a/b$. Thus the divider 29 of FIG. 1 is effective to perform a division of one of its input signals by the other.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:
1. A system for audibly recognizing a received signal aurally unclassifiable because of its improper time duration and/or the frequency band occupied thereby comprising:
   a signal-storage device;
   means for storing the signal in said device as received;
   means for retrieving the signal from said device at a time-rate differing from the storing rate;
   means for developing a control signal varying in magnitude with the weighted instantaneous frequency of said retrieved signal;
   and an adjustable-frequency audible-tone generator responsive to said control signal;
   said generator having an output circuit effective to supply an audible signal representative of the received signal.

2. A system for audibly recognizing an aurally unclassifiable received signal in accordance with claim 1 in which said signal-storage device is a multi-speed signal recorder movable at one speed during storage of a received signal thereon and at a different speed during retrieval of said signal therefrom.

3. A system for audibly recognizing an aurally unclassifiable received signal in accordance with claim 1 in which the received signal is a carrier wave modulated in amplitude and phase in accordance with the amplitude and phase of a signal to be recognized and which includes modulator means for deriving quadrature base-band signal components therefrom which are stored in said device.

4. A system for audibly recognizing an aurally unclassifiable received signal in accordance with claim 3 which includes means for deriving from said signal components a signal representative of the instantaneous frequency of said retrieved signal from which said control signal is derived.

5. A system for audibly recognizing an aurally unclassifiable received signal in accordance with claim 3 which includes means for deriving from said signal components a second control signal representative of the amplitude of said retrieved signal and means responsive to said second control signal for varying the amplitude of the audible-tone signal output of said generator.

6. A system for audibly recognizing an aurally unclassifiable received signal in accordance with claim 1 in which said audible-tone generator is a voltage-responsive variable-frequency oscillator.

* * * * *

UNITED STATES PATENT OFFICE
CERTIFICATE OF CORRECTION

Patent No. 3,955,050　　　　　　　Dated May 4, 1976

Inventor(s) Michael J. DiToro　　　　Page 1 of 8

It is certified that error appears in the above-identified patent and that said Letters Patent are hereby corrected as shown below:

ABSTRACT - line 3, change "bearable" to -- hearable --

Col. 3, line 37, change "$c_2$" to -- $c^2$ --

Col. 4, line 20, change "emtters" to -- emitters -- line 33, Equation (3), change the exponent "v" to -- V -- line 42,) change "$0_1$" to -- $\emptyset_1$ --
　　　　line 44,)

line 42,) change "$0_2$" to -- $\emptyset_2$ --
　　　　line 49,)

Col. 5, line 17, change the factor "$I_H$" (Equation (9)) to -- $I_8$ --

Claims 2 to 6, inclusive, should appear as shown on the attached sheets.

UNITED STATES PATENT OFFICE
CERTIFICATE OF CORRECTION

Patent No. 3,955,050                Dated  May 4, 1976

Inventor(s)  Michael J. DiToro

It is certified that error appears in the above-identified patent and that said Letters Patent are hereby corrected as shown below:

2. A system for audibly recognizing a received signal aurally unclassifiable because of its improper time duration and/or the frequency band occupied thereby comprising:

a signal-storage device;

means for storing the signal in said device as received;

means for retrieving the signal from said device at a time-rate differing from the storing rate;

a multi-speed signal recorder movable at one speed during storage of a received signal thereon and at a different speed during retrieval of said signal therefrom;

means for developing a control signal varying in magnitude with the weighted instantaneous frequency of said retrieved signal;

and an adjustable-frequency audible-tone generator responsive to said control signal;

said generator having an output circuit effective to

UNITED STATES PATENT OFFICE
CERTIFICATE OF CORRECTION

Patent No. 3,955,050  Dated May 4, 1976

Inventor(s) Michael J. DiToro  Page 3 of 8

It is certified that error appears in the above-identified patent and that said Letters Patent are hereby corrected as shown below:

supply an audible signal representative of the received signal.

3. A system for audibly recognizing a received signal aurally unclassifiable because of its improper time duration and/or the frequency band occupied thereby and comprising a carrier wave modulated in amplitude and phase in accordance with the amplitude and phase of a signal to be recognized comprising:

a signal-storage device;

modulator means for deriving quadrature base-band signal components from said received signal which are stored in said device;

means for retrieving the signal from said device at a time-rate differing from the storing rate;

means for developing a control signal varying in magnitude with the weighted instantaneous frequency of said

UNITED STATES PATENT OFFICE
CERTIFICATE OF CORRECTION

Patent No. 3,955,050  Dated May 4, 1976

Inventor(s) Michael J. DiToro

It is certified that error appears in the above-identified patent and that said Letters Patent are hereby corrected as shown below:

retrieved signal;

and an adjustable-frequency audible-tone generator responsive to said control signal;

said generator having an output circuit effective to supply an audible signal representative of the received signal.

4. A system for audibly recognizing a received signal aurally unclassifiable because of its improper time duration and/or the frequency band occupied thereby and comprising a carrier wave modulated in amplitude and phase in accordance with the amplitude and phase of a signal to be recognized comprising:

a signal-storage device;

modulator means for deriving quadrature base-band signal components from said received signal which are stored in said device;

UNITED STATES PATENT OFFICE
CERTIFICATE OF CORRECTION

Patent No. 3,955,050        Dated May 4, 1976

Inventor(s) Michael J. DiToro        Page 5 of 8

It is certified that error appears in the above-identified patent and that said Letters Patent are hereby corrected as shown below:

means for retrieving the signal from said device at a time-rate differing from the storing rate;

means for deriving from said signal components a signal representative of the instantaneous frequency of said retrieved signal;

means for developing a control signal varying in magnitude with the weighted instantaneous frequency of said derived signal;

and an adjustable-frequency audible-tone generator responsive to said control signal;

said generator having an output circuit effective to supply an audible signal representative of the received signal.

5. A system for audibly recognizing a received signal aurally unclassifiable because of its improper time duration and/or the frequency band occupied thereby and comprising a

UNITED STATES PATENT OFFICE
CERTIFICATE OF CORRECTION

Patent No. 3,955,050      Dated May 4, 1976

Inventor(s) Michael J. DiToro      Page 6 of 8

It is certified that error appears in the above-identified patent and that said Letters Patent are hereby corrected as shown below:

carrier wave modulated in amplitude and phase in accordance with the amplitude and phase of a signal to be recognized comprising:

a signal-storage device;

modulator means for deriving quadrature base-band signal components from said received signal which are stored in said device;

means for retrieving the signal from said device at a time-rate differing from the storing rate;

means for developing a control signal varying in magnitude with the weighted instantaneous frequency of said retrieved signal;

an adjustable-frequency audible-tone generator responsive to said control signal;

said generator having an output circuit effective to supply an audible signal representative of the received

UNITED STATES PATENT OFFICE
CERTIFICATE OF CORRECTION

Patent No. 3,955,050   Dated May 4, 1976

Inventor(s) Michael J. DiToro

It is certified that error appears in the above-identified patent and that said Letters Patent are hereby corrected as shown below:

signal;

means for deriving from said signal components a second control signal representative of the amplitude of said retrieved signal;

and means responsive to said second control signal for varying the amplitude of the audible-tone signal output of said generator.

6. A system for audibly recognizing a received signal aurally unclassifiable because of its improper time duration and/or the frequency band occupied thereby comprising:

a signal-storage device;

means for storing the signal in said device as received;

means for retrieving the signal from said device at a time-rate differing from the storing rate;

means for developing a control signal varying in

UNITED STATES PATENT OFFICE
CERTIFICATE OF CORRECTION

Patent No. 3,955,050                  Dated May 4, 1976

Inventor(s) Michael J. DiToro             Page 8 of 8

It is certified that error appears in the above-identified patent and that said Letters Patent are hereby corrected as shown below:

magnitude with the weighted instantaneous frequency of said retrieved signal;

and a voltage-responsive variable-frequency oscillator responsive to said control signal;

said oscillator having an output circuit effective to supply an audible signal representative of the received signal.

Signed and Sealed this

Seventh Day of September 1976

[SEAL]

Attest:

RUTH C. MASON  
*Attesting Officer*

C. MARSHALL DANN  
*Commissioner of Patents and Trademarks*